United States Patent [19]

Andersson et al.

[11] 4,293,612

[45] Oct. 6, 1981

[54] NEEDLE-PUNCH CARPET WITH BINDER CONTAINING ALKALI-STABILIZED SILICIC ACID

[75] Inventors: Kjell R. Andersson, Surte; Hans E. Johansson, Kungälv, both of Sweden

[73] Assignee: Elektrokemiska Aktiebolaget, Surte, Sweden

[21] Appl. No.: 112,443

[22] Filed: Jan. 16, 1980

[30] Foreign Application Priority Data

Jan. 18, 1979 [SE] Sweden .............................. 7900451

[51] Int. Cl.$^3$ ............................................. D04H 1/08
[52] U.S. Cl. ............................... 428/281; 427/430.1; 427/434.2; 428/283; 428/288; 428/289; 428/290; 428/331; 428/446
[58] Field of Search ............... 428/280, 281, 283, 288, 428/289, 290, 446, 331, 235, 300, 301; 427/430.1, 434.2

[56] References Cited

U.S. PATENT DOCUMENTS 2,750,345 6/1956 Alexander ........................... 252/313
3,969,295 7/1976 Sunden ........................... 260/29.6 S

*Primary Examiner*—Marion McCamish
*Attorney, Agent, or Firm*—Luedeka & Fitch

[57] ABSTRACT

The invention relates to a method for the production of needle-punch carpets with improved properties, in which method use is made, in the chemical bonding of the needle-felt, of alkali-stabilized silicic acid sol in combination with a latex of an organic binder which is conventional in this context. The amount of silicic acid is of the order of magnitude of from 1 to 30 weight % calculated as dry $SiO_2$ on dry polymer and the particle size may vary between 1 and 100 nm.

8 Claims, No Drawings

NEEDLE-PUNCH CARPET WITH BINDER CONTAINING ALKALI-STABILIZED SILICIC ACID

The present invention relates to a method for the production of improved needle-punch carpets. The invention also embraces the needle-punch carpet produced according to the method.

In the conventional production of needle-punch carpets, the fiber which is to be included in the needle-punch carpet is carded to a certain surface weight which normally lies between 300 and 600 g/m². The carded fiber is thereafter mechanically bonded in a needling machine. As a result, there is obtained a needle-felt of relatively poor mechanical properties, for which reason the needle-felt is chemically bonded with an organic binder of the latex type. The binder is applied to the needle-felt normally by, for example, saturation in a bath of binder, whereafter the needle-felt is dried. The amount of binder which is applied may be regulated by varying the dry content in the binder suspension and by pressing out binder after the saturation bath. Normally, the amount of binder which is required in the needle-felt amounts to from 20 to 30% of the fiber weight.

A normal method of extending expensive binders of the latex type is to add inorganic filler, for example kaolin, chalk, precipitated silicic acid etc. In the production of needle-punch carpets this is, however, inappropriate, since the binder is distributed throughout the entire cross-section of the carpet, that is to say the binder will also form part of the surface layer. On the presence of a conventional filler in the binder, an undesired opacity will be obtained in the binder and an increased tendency to "chalking" (i.e. white lines) on the carpet.

It has now surprisingly proved that if, in the chemical bonding of the needle-felt, the binder is combined with a filler which consists of an alkali-stabilized silicic acid, those disadvantages which are inherent in other types of fillers may be reduced or completely obviated, and a needle-punch carpet with clearly improved properties may be obtained.

In brief, the method according to the invention entails that a needle-punch carpet is produced in that fibers are carded, that the carded fibers are bonded mechanically and chemically, a latex of organic binder, possibly in combination with conventional additives, being used for the chemical bonding, and that the thus obtained carpet is dried, the method being characterized in that the binder, with possible conventional additives, is present in combination with alkali-stabilized silicic acid of a particle size of the order of from 1 to 100 nm.

The invention also relates to needle-punch carpets which are produced according to this method.

According to the present invention, use may be made, for the production of the needle-punch carpet, of such fibers as are conventionally used in this context. Synthetic fibers such as polypropylene, nylon and acryl fibers are to be particularly preferred. Similarly, the present invention calls for the use of such binder latexes as may be considered as conventional in the art. Particularly suitable binders are SBR, polyacrylate, polyacrylonitrile, the most common binder from this group being SBR because of its relatively low cost.

The conventional additives which may be added to the latex may consist of flame-proofing agents, antistatic agents etc.

The silicic acid which is used in combination with the binder latex according to the present invention consists of a so-called alkali-stabilized silicic acid sol. This type of silicic acid is previously known and is distinguished by very small polymolecular particles in water (colloids) which particles are stabilized with a minor amount of alkali in the form of $Na_2O$, $K_2O$, $Li_2O$ or ammonia. The silicic acid particles may be of the size range of from 1 to 100 nm. The best results have hitherto been obtained with particle sizes of less than 10 nm. The silicic acid forms part of the latex in an amount of from 1 to 30 weight % dry $SiO_2$/dry polymer and a particularly preferred range is from 5 to 20 weight %.

According to the invention, it has unexpectedly proved that an addition of the above-defined alkali-stabilized silicic acid sol to the binder gives a considerable improvement as regards the abrasion resistance of the finished carpet. A further advantage involved in this type of filler is that the transparency of the binder is not negatively affected and that there is no tendency to "chalking" in the carpet. The fact that colloidal silicic acid in the form of the above-disclosed alkali-stabilized silicic acid sol is superior in this regard is probably because the silicic acid consists of very small particles (less than 100 nm) of poor visible light dissemination power, which particles are uniformly distributed in the binder, whereby the transparent appearance of the binder is retained. The method according to the invention also makes possible a drastic reduction of the binder content in the needle-punch carpet with retained and/or even improved properties. In the conventional manufacture of needle-punch carpets in which relatively high contents of binder are used, it is possible, for example, by adding small amounts, for instance from 10 to 20 weight % of alkali-stabilized silicic acid according to the present invention, to reduce the amount of conventional binder by up to 50 weight %. The alkali-stabilized silicic acid according to the present invention may probably, therefore, be considered as an "auxiliary binder" instead of as a conventional filling agent. This entails that it is possible, by using the above-defined silicic acid, to reduce manufacturing costs for the needle-punch carpet.

The invention will be described in greater detail below by means of the following Examples.

EXAMPLE 1

A felt of polypropylene fibers (fiber length 100 mm) was carded to a surface weight of 400 g/m² and mechanically bonded by needling. A latex bath was prepared in that 50 g of SBR latex (50%) was diluted with 700 ml of water, the dry content of the latex bath being then 21%. The needle-felt was allowed to pass slowly through the latex bath and was pressed-out carefully between two rollers, whereafter the felt was dried in hot air at 120° C. The surface weight after the drying was 520 g/m², which corresponds to 30% SBR binder on the weight of the fiber. The abrasion-resistance properties were determined according to the Lisson test (SIS 832533) at 3.4.

EXAMPLE 2

A latex bath was prepared in that 200 g of SBR latex (50%) was diluted with 900 ml of water, whereafter 100 g of alkali-stabilized silicic acid sol (15%) with a colloid size of 6 nm were added. The dry content will then be slightly under 10% and the $SiO_2$ content 15% based on dry SBR polymer. A needle-felt was impregnated and dried as in Example 1. After drying, the surface weight was 465 g/m$^2$, that is to say 16% of $SiO_2$-modified SBR binder had been absorbed, calculated on the fiber weight.

Tests of the abrasion resistance showed that the carpet with alkali-stabilized silicic acid sol, despite containing roughly half of the amount of binder, displayed better abrasion resistance than did the carpet according to Example 1.

The carpet also showed a slightly lower static charging and slightly higher soiling resistance as compared with the carpet according to Example 1.

The abrasion test according to SIS 832533 gave a calculated value of 4.1, that is to say the quality of the carpet had been raised by almost one class (according to the NCC system), even though the binder content in the carpet had been reduced by half. No increased "chalking" tendency could be found in the carpet.

What we claim and desire to secure by Letters Patent is:

1. A method for the production of a needle-punch carpet in which method synthetic fibers are mechanically and chemically bonded, the synthetic fibers being treated, for the chemical bonding, with a latex of an organic binder and the obtained carpet being dried, the improvement comprising employing an organic binder latex containing from 1–30 weight percent silicic acid, calculated as dry $SiO_2$/dry organic binder in the form of an alkali-stabilized silicic acid sol having a particle size of from 1 to 100 nm.

2. The method as recited in claim 1, wherein the alkali-stabilized silicic acid sol has a mol ratio of $SiO_2$ to $M_2O$ of from 5 to 500, in which M designates Na, K, Li or ammonia ($NH_3$), and a particle size of from 2 to 50 nm.

3. The method as recited in claim 1, wherein the alkali-stabilized silicic acid sol has a colloidal particle size of from 2 to 10 nm.

4. The method as recited in claim 1, wherein the synthetic fiber is selected from the group comprising polypropylene and nylon.

5. The method as recited in claim 1, wherein the organic binder is selected from a group comprising SBR, polyacrylate and polyacrylonitrile.

6. The method as recited in claim 1, wherein the organic binder is applied to the fiber by impregnation in a saturation bath.

7. A needle punch carpet comprising synthetic fibers which are mechanically bound together by needling and which are further chemically bound together by the dried residue of an aqueous mixture of an organic binder latex and an alkali-stabilized silicic acid sol having particles of a size between 1 and 100 nm, the particles being present in an amount comprising between 0.1 to 12 percent by weight, calculated as dry $SiO_2$, based upon the weight of the synthetic fibers, and the amount of dry $SiO_2$ being between 1 and 30 weight percent of the organic binder solids, said residue being dispersed throughout the body of the carpet whereby said carpet exhibits an improved abrasion resistance and chalking is minimized.

8. The needle-punch carpet as recited in claim 7, wherein it contains from 0.5 to 8 weight % alkali-stabilized silicic acid.

* * * * *